Nov. 30, 1954

N. DEMOS 2,695,810

TRANSPORTING DEVICE FOR AUTOMOTIVE
VEHICLES AND FREIGHT

Filed Jan. 6, 1954

Inventor
Nicholas Demos
By
Attorney

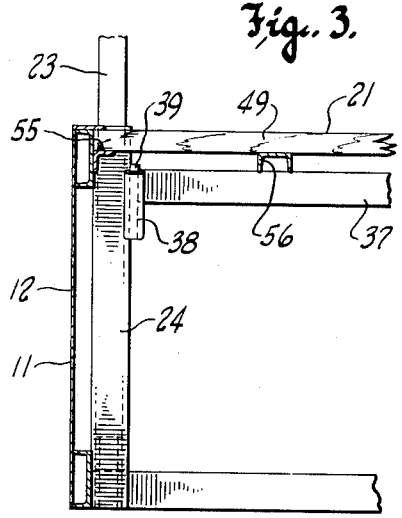
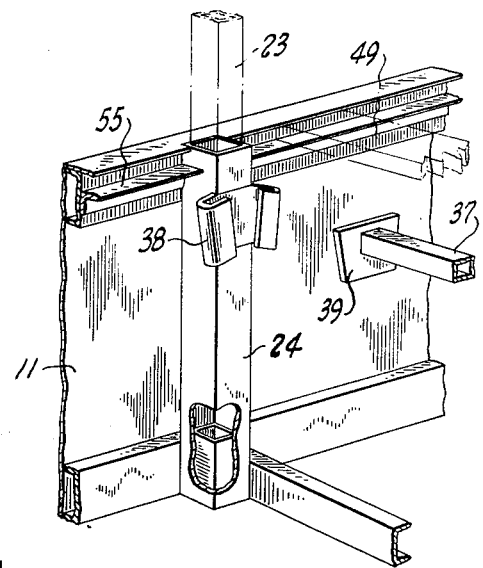
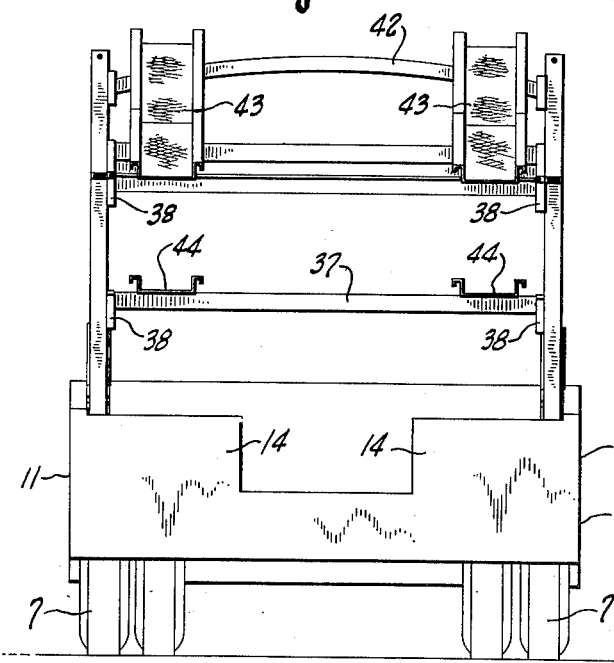
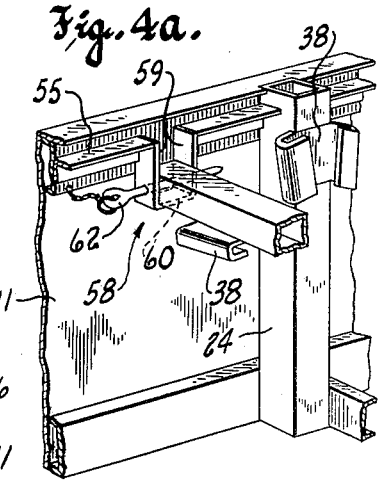

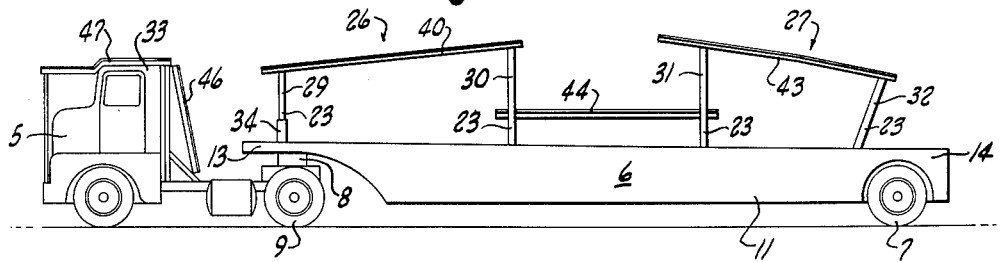
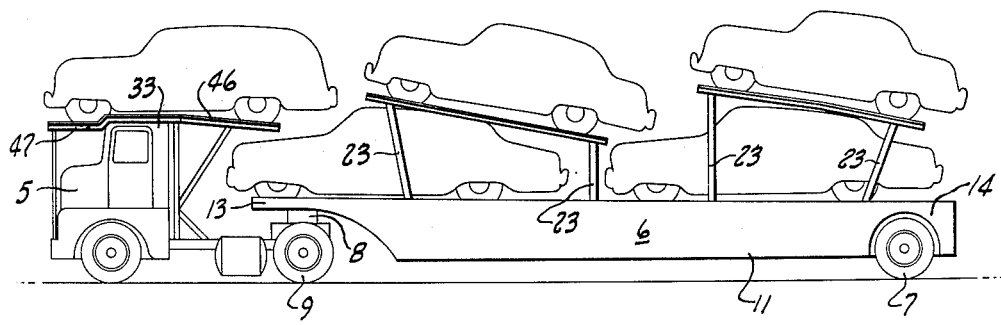
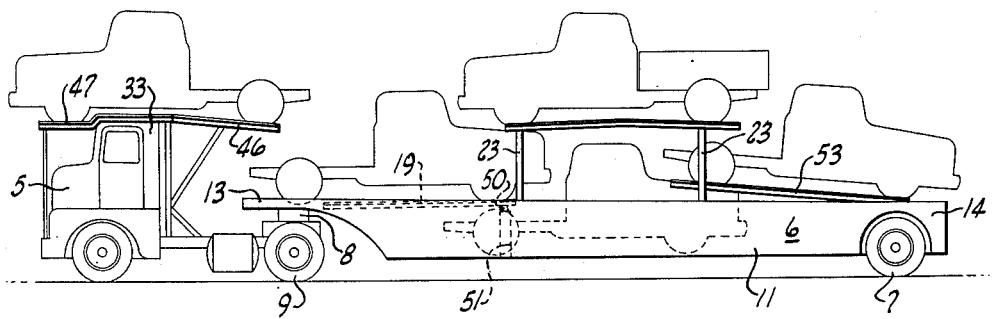

United States Patent Office 2,695,810
Patented Nov. 30, 1954

2,695,810

TRANSPORTING DEVICE FOR AUTOMOTIVE VEHICLES AND FREIGHT

Nicholas Demos, Kenosha, Wis.

Application January 6, 1954, Serial No. 402,439

12 Claims. (Cl. 296—1)

This invention relates to transporting devices for automotive vehicles and freight, and has more particular reference to improvements in transport devices of the semi-trailer type like that shown and described in my co-pending application Serial No. 316,660, filed October 24, 1952, now Patent No. 2,684,264.

The semi-trailer of said copending application is characterized by the provision of knockdown superstructure which allows the semi-trailer to be used for the transportation of four automobiles or other vehicles, and to be readily converted to a low flat top carrier for hauling oversize road vehicles or freight. Two automobiles may be carried on the semi-trailer at a low level thereon and two more automobiles may be loaded onto the trailer at a higher level thereon, each substantially directly over one of the lower automobiles. The tractor upon which the front end of the trailer is supported is adapted to carry a fifth automobile in a position directly over the cab of the tractor.

The absence of permanent superstructure, of course, is one of the main reasons for the unusual versatility of the so-called flat top trailer. In addition it features low cost of manufacture and a minimum weight consistent with sturdiness of construction.

Though five automobiles or other types of automotive vehicles may be transported by the truck-trailer combination described, four on the trailer and one on the truck, within the commonly accepted dimensional limitations of 45 feet in length, 13½ feet in height and 8 feet in width, it was nevertheless impossible to realize all of the advantages of the flat top semi-trailer combination described. It had to be loaded in a more or less conventional manner with four automobiles for travel through the State of Pennsylvania for the reason that the laws of this state prohibit the loading and transport of an automotive vehicle over the driver's cab on the tractor of a semi-trailer of any type.

It is therefore an object of the present invention to provide an improved semi-trailer of the flat top type featured in my aforesaid copending application, but wherein the trailer per se is capable of transporting legally either four or five full size automobiles. Thus the transport device of this invention can be used to transport five automobiles with one of them supported on the driver's cab, or for hauls to or leading through the State of Pennsylvania it may be readily converted so that all five automobiles are supported on the semi-trailer per se.

More specifically it is an object of this invention to provide exceptionally simple knockdown superstructure means for a flat top trailer of the character described in which three sets of automobile supporting tracks for the upper level automobiles on the trailer are supported by a minimum number of dismountable uprights rigidly but dismountably carried by the chassis sides.

Another object of this invention resides in the provision of stirrups on the chassis sides to receive the opposite ends of superstructure posts when the superstructure is knocked down, to support said posts in a horizontal position on the trailer, extending horizontally between the chassis sides, at a level just beneath that of a platform on the trailer, to reinforce said platform for the carrying of heavy loads thereon.

Still another object of this invention resides in the provision of cross beams connectable between the upper end portions of the dismountable uprights of the knock-down superstructure to support the upper deck tracks of the transport device, which cross beams may be utilized for the additional purpose of reinforcing the removable platform or freight supporting deck when freight is to be hauled on return trips.

Still another object of this invention resides in the provision of an improved method of loading five automotive vehicles onto a semi-trailer having a length only slightly greater than twice the length of a full size automobile.

With these and other objects in view which will appear as the description proceeds, this invention resides in the novel method of loading the semi-trailer of this invention, and in its novel construction, combination and arrangement of parts substantially as hereinafter described, and more particularly defined by the appended claims, it being understood that such changes in the precise embodiment of the hereinafter disclosed invention may be made as come within the scope of the claims.

The accompanying drawings illustrate one complete example of the physical embodiment of the invention constructed in accordance with the best mode so far devised for the practical application of the principles thereof, and in which:

Figure 2 is a rear elevational view of the device shown in Figure 1 but at an enlarged scale;

Figure 3 is a fragmentary sectional view taken through Figure 1 along the plane of the line 3—3;

Figure 4 is a fragmentary perspective view of that portion of the semi-trailer shown in Figure 3 and illustrating one of the freight deck supporting beams detached from the trailer chassis;

Figure 1:
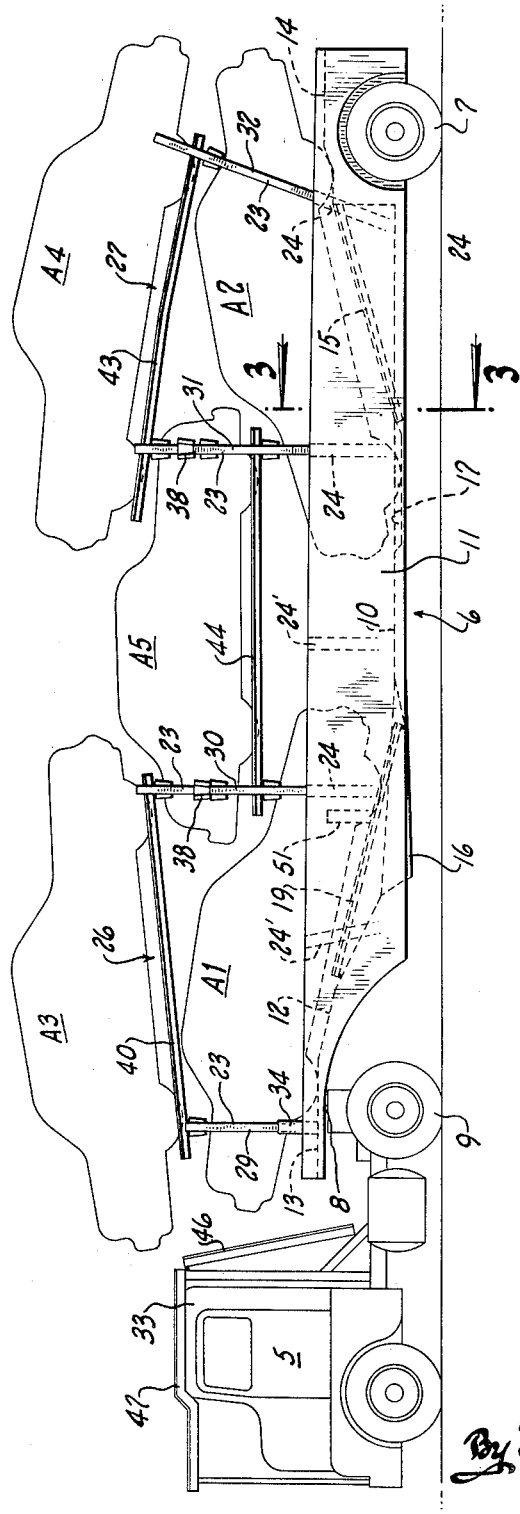
Figure 1 is a more or less diagrammatic side elevational view of the transport device of this invention showing the dismountable superstructure erected to adapt the device for the carrying of five automotive vehicles, all on the semi-trailer.

Figure 4a is a fragmentary perspective view similar to Figure 4 but illustrating the manner in which the upright supports of the knockdown superstructure may be stored in a platform reinforcing position; and Figures 5, 6 and 7 are diagrammatic side elevational views illustrating different ways in which the transport device of this invention may be readily converted for the most advantageous hauling of different types of automotive vehicles.

Referring now more particularly to the accompanying drawings in which like numerals designate like parts throughout the several views, the transport device of this invention will be seen to comprise a truck or tractor 5 of the short wheel base type, and an elongated semi-trailer 6 having a length slightly greater than twice that of a full size automobile. Wheels 7 support the rear of the semi-trailer chassis, and its front end has a fifth wheel draft connection 8 with the rear of the tractor. The front end of the trailer, therefore, is pivotally supported upon the rear of the tractor directly over the rear wheels 9 thereof.

The trailer 6 is essentially like the flat top trailer of my copending application, Serial No. 316,660, filed October 24, 1952; and the combined length of the tractor 5 and trailer 6 does not exceed 45 feet.

The trailer chassis has a low bottom portion 10 which may be in the nature of a floor extending between the wheels 7 and 9 at the opposite ends of the trailer, substantially on a level corresponding to that of the wheel axes. Upright rigid longitudinal sides 11 rigidly joined to the bottom portion of the chassis extend upwardly therefrom only slightly above the level of the tops of the wheels, and in fact the trailer may be said to have no permanent portion thereof extending above a level closely adjacent to that of the tops of the trailer wheels. Due to the fifth wheel connection 8, the bottom front portion of the trailer is slanted upwardly and forwardly as at 12, and terminates in a substantially horizontal apron 13 at the extreme front of the trailer directly over the fifth wheel connection 8 and the rear wheels of the tractor.

At its rear the bottom portion of the trailer is stepped upwardly to provide a wheel housing 14 over the rear wheels 7. Downwardly and forwardly inclined tracks 15 extend between the top of the wheel housing 14 and the bottom portion of the chassis a distance forwardly of the wheel housing, to provide a loading and unloading ramp for the lower deck automobiles A1 and A2.

When transporting five automobiles, all on the trailer, two of the automobiles, A1 and A2, are placed at a low level on the trailer chassis, with the automobile A1 at the front and facing rearwardly, and the automobile A2 at the rear and facing forwardly. The apron 13 may conveniently provide the supporting means for the rear wheels of the front automobile A1, while the top of the wheel housing 14 provides the supporting means for the rear wheels of the rear automobile A2.

The supports for the front wheels of both automobiles are located a substantial distance beneath the level of the rear wheel supports, and may be provided by the bottom portion 10 of the chassis. As indicated best in Figure 1, however, the bottom portion of the chassis is provided with front and rear wheel wells 16 and 17, respectively, the bottom of the latter affording front wheel supports for the rear automobile A2 a slight distance beneath the level of the bottom portion 10 of the chassis, so that the automobile A2 occupies a forwardly and downwardly inclined position on the rear portion of the trailer.

Inasmuch as the deeper front wheel wells 16 are provided primarily for use when transporting pickup trucks, as explained at length in my aforesaid copending application, other means are preferably provided to support the front wheels of the automobile A1. These front wheel supports preferably comprise a set of substantially short downwardly and rearwardly inclined tracks 19 having their forward ends detachably secured to the upwardly sloping bottom portion 12 a distance forwardly of the wheel wells 16, and having their lower ends received in the rear portions of the wheel wells 16 so as to be directly adjacent to the level of the bottom portion 10. The tracks 19, therefore, extend over the wheel wells 16 and cooperate with the apron 13 to support the automobile A1 in a downwardly and rearwardly inclined position on the front portion of the trailer.

It is important to note that the front wheel supports for the automobiles A1 and A2 are spaced a distance from one another at a zone medially of the ends of the trailer. Consequently the opposing front ends of the two automobiles are so spaced that the distance between their windshields is greater than the wheel base of a full size automobile.

The semi-trailer of this invention embodies knockdown superstructure and a removable platform 21 which constitutes a freight supporting deck at a low level close to that of the tops of the wheels. This platform is, of course, entirely unobstructed when the superstructure is dismounted.

Since these features are fully described in my aforesaid copending application, it will be unnecessary to describe them at great length in this application. It should be observed, however, that the sides 11 of the trailer comprise rigid frames the upper edges of which terminate at a level close to that of the tops of the trailer wheels; and that the dismountable superstructure comprises transversely opposite pairs of upright posts 23 removably stepped into elongated tubular socket forming members 24 fixed on the chassis sides and forming a part of the framework of which the sides are comprised.

Even though the trailer of this invention is used for the transportation of five full size automobiles, all of them located on the trailer portion per se, only four pairs of upright posts 23 are employed in the superstructure. Two pairs of such posts comprise the uprights for a front dismountable superstructure 26, and two more pairs of posts comprise the uprights for a rear dismountable superstructure 27.

Thus as viewed in Figures 1 and 5 it will be seen that the front dismountable superstructure 26 is comprised of transversely opposite pairs of front and rear posts 29 and 30, respectively, and that the rear dismountable superstructure 27 is likewise comprised of transversely opposite pairs of front and rear posts 31 and 32, respectively.

The transversely opposite posts 29 are relatively short and project upwardly to a level substantially corresponding to the top of the cab 33 of the tractor 5. These posts have their lower ends stepped into elongated tubular socket members 34 permanently affixed to the apron 13 at the front of the trailer, directly adjacent to the opposite sides thereof, substantially in transverse alignment with the fifth wheel connection 8. Whereas all of the remaining tubular socket members 24 have a vertical height equal to that of the chassis sides and have their upper ends terminating substantially flush with the upper edges of the chassis sides, the socket members 34 at the front of the trailer project upwardly from the apron 13 a short distance beyond the upper edges of the chassis sides to receive the lower ends of the posts 29. The socket members 34 obviously cannot project downwardly without interfering with the rear wheels 9 of the tractor during relative pivotal motion between the tractor and the trailer about the fifth wheel connection 8.

The rear posts 30 of the front superstructure 26 are stepped in tubular socket forming members 24 located entirely below the upper edges of the chassis sides and these posts extend upwardly a distance beyond the ends of the front posts 29, from areas which are spaced a substantial distance rearwardly of the posts 29 and approximately equal to one-third the distance between the front and rear wheels by which the trailer is supported.

A cross beam, such as that indicated at 37 in Figure 2, removably secured to the front posts 29 between their upper ends is provided to support the forward ends of a pair of automobile carrying tracks 40. Another beam, such as indicated at 42 in Figure 2, may be detachably connected between the upper ends of the rear posts 30 to support the rear ends of the tracks 40.

The detachable connections between the beams and posts are like those disclosed in my aforesaid copending application, and comprise wedge shaped sockets 38 on the opposing faces of the posts, in which wedge-like plates 39 on the ends of the beams are receivable.

The manner in which the tracks 40 are detachably connected to the cross beams is also shown and described at length in my aforesaid copending application and it is important here only to emphasize the fact that the tracks are supported by the cross beams and the upright posts in an upwardly and rearwardly inclined elevated position providing clearance for the reception of the automobile A1 on the trailer beneath the tracks.

The front and rear end portions respectively of the tracks 40 will be seen to be disposed directly over the rear and front wheel supports for the automobile A1 so that an automobile A3 on the tracks will be directly over the automobile A1 but will have its rearwardly facing front end portion disposed a distance above the hood portion of the automobile therebeneath. Thus it will be seen that the front superstructure 26 differs appreciably from the front superstructure of the trailer of my aforesaid copending application, which is like that diagrammatically illustrated in Figure 6, both as to the placement of the two pairs of upright supports or posts with respect to the front end portion of the trailer and the angle of inclination of the tracks which are supported on the upper end portions of the posts.

The arrangement of posts and tracks and the related structure which comprises the superstructure 27 is substantially identical to that of my aforesaid copending application, with the exception that the tracks 43 which support the rear upper deck automobile A4 are slightly longer and project forwardly of the front pair of posts somewhat farther to enable one of the longer wheel base automobiles to be carried thereby. The front posts 31 may extend upwardly only a very slight distance beyond the level of the tops of the posts 30 of the front superstructure, while the rear posts 32 are disposed at the same degree of rearward tilt as those in the four car arrangement shown in Figure 6.

From the description thus far it will be apparent that the two lower deck automobiles T1 and A2 are supported in longitudinally spaced transit positions, inclined downwardly toward the midpoint of the trailer, while the two upper deck automobiles A3 and A4 are supported in longitudinally spaced relationship over the automobiles A1 and A2 but are inclined upwardly toward the midpoint of the trailer. This leaves a space above the hood portions of the two lower deck automobiles and between the opposing front ends of the two upper deck automobiles large enough to accommodate a fifth automobile in the medial zone of the trailer.

It is a feature of this invention that the fifth automobile A5 can be transported on the trailer without either of the upper deck automobiles exceeding the commonly accepted height limitation of 13½ ft. for the loaded unit, and without requiring any additional upright supports for the tracks 44 upon which the automobile A5 is carried. As indicated best in Figures 1 and 2 the tracks 44 are supported in horizontal positions upon cross beams 37 which extend between and are detachably joined to the rear posts 30 of the front super-structure and to the front posts 31 of the rear superstructure.

The cross beams 37, of course, have tapered plates 39 on their ends readily removably engaged in tapering socket members 38 on the posts located at a slight elevation above the upper edges of the chassis sides.

Since the tracks 44 extend substantially horizontally lengthwise between the windshields of the two lower deck automobiles, the automobile A5 will have its opposite end portions nested in the spaces between the superimposed front end portions of the upper and lower automobiles, and the top structure of the automobile A5 will occupy a position extending upwardly into the space between the wheels at the opposing front ends of the two upper deck automobiles. This is the most compact arrangement of automobiles which can be achieved on a trailer having a length only slightly greater than twice that of a full size automobile.

While the automobile A2 on the lower rear portion of the trailer has been described as occupying a downwardly and forwardly inclined position, this position thereof is necessary only when the trailer has all of its rear wheels on one axle, necessitating the wheel housing 14 thereover. If the two wheels at either side of the rear of the trailer are arranged tandem fashion, the lower portion or floor 10 of the trailer can be extended horizontally to the extreme rear of the trailer, at the level of the wheel axes, and the automobile A2 can be carried in a horizontal transit position with both of its wheels at the low level of the trailer wheel axes.

The method of loading five full size automobiles on the trailer in the positions described has the advantage of making it possible for the first time to carry five automobiles on a semi-trailer transport device without having one of the transported automobiles carried over the driver's cab 33. This, of course, makes it possible to transport five automobiles on the trailer into and through the State of Pennsylvania, where it is unlawful to operate an automobile transport device having one of the transported automobiles carried on the driver's cab.

The Figure 5 diagram is essentially like the side elevational view of the loaded device shown in Figure 1, and is intended for comparison with the arrangement shown in Figure 6. As stated previously the Figure 6 unit is like that of my aforesaid copending application, being provided with dismountable superstructure to enable four cars to be carried by the trailer and one additional automobile to be supported on the cab of the tractor 5.

If desired the transport device of this invention, with superstructure arranged as in Figure 5, may be readily converted for the transportation of five automobiles in the manner shown in Figure 6, merely by securing the rear halves 46 of the tracks 47 on the truck in raised positions, and selecting upright supports or posts of suitable length for the front superstructure. These posts may be stepped in transversely opposite pairs of tubular socket members 24' provided on the chassis sides for that purpose. It will be appreciated also that when four automobiles are to be carried by the trailer, the lower deck automobiles A1 and A2 may be supported either as indicated in Figure 1 or upon a removable horizontal freight supporting platform, indicated in construction lines at 49 in Figure 4, in the manner suggested in Figure 6, and described at greater length in my aforesaid copending application.

The trailer of this invention can also be readily converted for the hauling of four pickup trucks as indicated in Figure 7, showing an additional truck loaded upon the truck or tractor of the combination. The method of loading the pickup trucks, however, is a feature of my aforesaid application.

It is important only to observe that in the present invention the relatively short tracks 19 in the lower forward portion of the trailer are dismountable to enable them to be supported in the horizontal position seen in Figure 7. Their forward ends thus rest on the apron 13, and their rear end portions are carried by short posts 50 received in tubular sockets 51 rigidly fixed to the chassis sides a slight distance forwardly of the sockets for the posts 30. The sockets 51 do not extend upwardly as far as the top edges of the chassis sides but terminate a short distance below the level thereof to allow a cross beam such as the beam 37 to be connected between the upper ends of the posts 50. Rigid cantilever arms (not shown) permanently fixed to the posts 50 at a level just beneath that of the upper edges of the chassis sides may be used instead of a cross beam 37 to support the front ends of the tracks 19 in the Figure 7 arrangement.

The tracks 19, however, need only support the rearwardly facing front end of the foremost pickup truck on the trailer, since the rear wheels of said truck can be supported directly on the apron 13.

The rear pickup truck illustrated in Figure 7 may have its rearwardly facing front portion supported directly upon the wheel housing 14 or upon the rear ends of tracks 53, the forward end portions of which tracks are supported on a cross beam (not shown) connected between the rear set of posts for the upper deck truck.

Obviously many other arrangements for the support of different types of vehicles will suggest themselves and can be readily achieved due to the ease with which the component parts of the superstructure may be relocated in any desired arrangement. In this connection, it should be understood that tubular socket members may be provided wherever needed along the chassis sides.

When the superstructures are not needed they may be dismounted and the trailer converted into a flat top conveyance which is especially useful for hauling all types of freight as well as oversize road vehicles which cannot readily be transported in any other manner. The planks 49 of which the removable platform 21 is comprised are supported upon substantially horizontal ledges 55 fixed to the inner sides of the chassis near their upper edges in the same manner as described in my aforesaid copending application, and it is a feature of this invention that the cross beams 37 which form parts of the superstructure may be employed to reinforce the platform to enable it to carry exceptionally heavy loads.

For this purpose certain transversely opposite pairs of tubular socket members 24 at spaced points along the length of the trailer may be provided with female wedge connectors 38, as seen in Figure 4, of the same size and shape as those on the posts, to receive the tapered plates 39 on the ends of the cross beams to rigidly support the cross beams in a position directly beneath but slightly spaced from the underside of the platform 21. Elongated bars or channels 56 may be laid longitudinally across the tops of the cross beams 37, as indicated in Figure 3, to provide rigid supports for the platform 21 along those areas thereof over which the heaviest loads are likely to be imposed. For instance if a heavy road scraper or the like is to be carried by the platform, one or more channels 56 can be laid across the beams 37, spanning two or more of them, at such transverse spacing as to correspond to the tread of the road scraper and thus preclude damage to the planks of which the platform is comprised.

The cross beams 37, when connected between the upper portions of the chassis sides in the platform reinforcing positions described, also serve to reinforce the chassis sides against lateral flexure under the influence of a heavy load borne by the platform.

If desired, the posts of the superstructures may also be used to reinforce the platform 21 and to rigidize the chassis sides when the superstructure is knocked down and the platform is to be used for the transportation of heavy loads such as road working apparatus and the like. For this purpose, all of the posts of the superstructure may be made the same length, slightly less than eight feet long, to fit lengthwise between the opposite sides of the chassis. If all of the posts are not needed for reinforcement of the platform, the posts 29 for the front superstructure 26 are preferably made shorter, as seen in Figures 1 and 5, but the remaining posts 30, 31 and 32 are all of the same length, namely slightly less than eight feet, and it will be noted that the uppermost female connectors or wedge blocks 38 on the posts are spaced a distance from the upper extremities of the posts. This allows the opposite end portions of the posts to be readily seated in transversely opposite pairs of stirrups such as indicated at 58 in Figure 4a, fixed on the inner faces of the chassis sides. The pairs of stirrups, of course, are longitudinally spaced along the chassis sides at regular intervals of about three to four feet, with those nearest the front of the trailer spaced a slight distance rearwardly of the apron 13 and those nearest the rear of the trailer spaced a slight distance forwardly of the wheel housing 14.

The stirrups are generally U shaped, as seen in Figure 4a, each having opposite upright arms 59 spaced apart a distance to loosely embrace the end portion of one of the posts, and joined at their extremities to the ledges 55 which support the platform 21 on the trailer. The bight 60 of each of the stirrups is positioned substantially horizontally a distance beneath the ledges 55 sufficient to locate the posts resting on the bight portions of the stirrups with the upper faces of the posts substantially in the same plane as the tops of cross beams 37 when the latter are in their platform reinforcing positions. Hence, the same longitudinally extending channels 56, or the like, may be laid on the posts, wherever desired, to support the platform 21.

It should be understood, of course, that the ledges 55 are interrupted at each stirrup location, to provide an upwardly opening entrance to the stirrup.

The end portions of the posts are preferably pinned to the stirrups, as by pins 62 passing through suitable aligning apertures in the posts and the arms 59 of the stirrups, to thus rigidly join together the upper portions of the chassis sides and preclude any tendency of the sides to flex laterally toward and from one another under the influence of a heavy load on the platform 21.

In addition to their functions of supporting the posts and cross beams in platform reinforcing positions, it will be appreciated that the stirrups 58 and wedge connectors or blocks 38 provide convenient means for storing these superstructure parts whenever they are not needed. In other words, when sufficient numbers of the wedge blocks and stirrups are fixed to the chassis sides as described, nearly all of the superstructure parts (except the tracks) may be mounted thereon and kept from objectionable rattling or banging against the chassis sides and bottom as they would if placed loosely in the bottom portion of the chassis.

From the foregoing description taken together with the accompanying drawings it will be readily apparent to those skilled in the art that this invention provides a transport device featuring an exceptionally strong flat top trailer of unusual versatility in that it can be used for the transportation of automotive vehicles in a variety of different ways; and which for the first time enables five full size automobiles to be carried by the trailer with none of them supported over the cab of the tractor by which the trailer is pulled.

What I claim as my invention is:

1. In a semi-trailer for transporting five full size automobiles: an elongated chassis having wheels and having opposite longitudinally extending upright sides; means comprising two sets of front and rear wheel supports for supporting two automobiles in low level transit positions on the opposite end portions of the trailer, at downwardly convergent angles to one another and with their front ends in opposing relationship and their windshields spaced apart at the mid-portion of the trailer a distance greater than the wheel base dimension of a third automobile to be carried by the trailer, the rear wheel supports being located adjacent to the opposite ends of the trailer at an elevation above but close to that of the tops of the trailer wheels, and the front wheel supports of each set being disposed part way between their cooperating back wheel supports and a point medially of the ends of the trailer and at a level beneath that of the rear wheel supports and adjacent to the level of the axis of the trailer wheels; intermediate automobile supporting means for supporting a third automobile in a transit position medially of the ends of the trailer with the wheels of said third automobile closely overlying the hoods of the low level automobiles, said intermediate automobile supporting means comprising a pair of tracks, and means on the chassis sides mounting said pair of tracks lengthwise on the trailer with the tracks extending substantially horizontally over the mid-portion of the trailer and with the opposite end portions of the tracks directly over said front wheel supports and spaced thereabove a distance sufficient to accommodate the hood portions of said low level automobiles therebeneath; and upper front and rear tracks carried by the chassis sides for supporting two automobiles in high level inclined transit positions, each lying over one of the low level automobiles and extending over an adjacent end portion of the intermediate automobile, said upper tracks converging upwardly toward one another and having their lower end portions spaced above said rear wheel supports a distance sufficient to accommodate the rear end portions of said low level automobiles therebeneath, and having their higher end portions spaced above the adjacent end portions of the intermediate tracks a distance sufficient to accommodate the adjacent end portions of the intermediate automobile therebeneath.

2. In a semi-trailer for transporting five full size automobiles: an elongated chassis having supporting wheels adjacent to its rear end and adapted to have its front end supported by the rear wheels of a truck, said chassis having a bottom portion between said front and rear wheels substantially on a level corresponding to that of the wheel axes; means for supporting two automobiles in longitudinally spaced low level transit positions on the opposite end portions of the trailer with their front ends facing one another, comprising supporting members for the front wheels of each of said low level automobiles located adjacent to the bottom portion of the chassis and spaced apart longitudinally of the trailer at a zone medially of its ends, and rear wheel supporting members for said low level automobiles, the rear wheel supporting members at the front of the trailer being disposed at an elevation above that of the low level supporting members and adjacent to the level of the tops of the trailer wheels; means for carrying a third automobile in an elevated transit position on the trailer in said medial zone thereof, with the wheels of said third automobile in the space between the windshields of said low level automobiles and closely overlying the hoods thereof, said last named means comprising a pair of transversely spaced tracks long enough to receive the front and rear wheels of said third automobile, and rigid supports on the chassis sides mounting said tracks in said medial zone of the trailer with the end portions of the tracks substantially directly over but spaced a distance above said front wheel supporting members; and means for supporting two more automobiles on the trailer comprising upper front and rear tracks carried by the chassis over the opposite end portions thereof, said last named tracks converging upwardly toward one another and having their lower ends substantially directly over but spaced above said rear wheel supporting members a distance sufficient to accommodate the rear end portions of said low level automobiles therebeneath, and having their higher end portions substantially directly over but spaced above the end portions of the tracks for said third automobile a distance sufficient to accommodate the end portions of said third automobile therebeneath.

3. In a semi-trailer for transporting five full size automobiles: an elongated chassis having supporting wheels adjacent to its rear end and adapted to have its front end supported by the rear wheels of a truck, said chassis having a bottom portion between said front and rear wheels substantially on a level corresponding to that of the wheel axes; upper and lower automobile carrying track members mounted on the chassis at each end portion of the trailer, the rear portions of the front upper and lower track members diverging rearwardly in opposite directions from the horizontal and being spaced forwardly of a point midway between the ends of the trailer, and the front portions of the rear upper and lower track members diverging forwardly in opposite directions from the horizontal and being spaced rearwardly of said mid-point, and the adjacent end portions of the lower front and rear track members being at a level adjacent to that of said bottom portion of the chassis; and intermediate automobile carrying track members mounted on the chassis in a zone medially of the ends of the trailer and extending substantially horizontally between the divergent end portions of said front and rear upper and lower track members at a level substantially midway between the bottom portion of the chassis and the adjacent end portions of said upper front and rear track members.

4. In a semi-trailer for transporting five full size automobiles: a chassis having a length slightly greater than twice the length of a full size automobile, said chassis having supporting wheels adjacent to its rear end and being adapted to have its front end supported by the rear wheels of a truck, and said chassis having a bottom portion between said front and rear wheels substantially on a level corresponding to that of the wheel axes; means for supporting two automobiles in longitudinally spaced apart low level transmit positions on the opposite end portions of the trailer with their front ends facing one another and in the bottom portion of the chassis; longitudinally spaced front and rear superstructure means carried by the chassis for supporting two more automobiles on the trailer, each directly over one of said low level automobiles, each of said superstructure means comprising two longitudinally spaced pairs of rigid load bearing posts extending upwardly from the chassis sides with the posts of each pair transversely opposite one another, and automobile carrying tracks extending longitudinally between and supported by said pairs of posts of each of said superstructure means at upwardly convergent angles with respect to each other; and other automobile carrying tracks extending longitudinally between and supported by the rear posts of the front superstructure means and the front posts of the rear superstructure means with said other tracks occupying a substantially horizontal position at a level substantially midway between the bottom portion of the chassis and the upper end portions of the tracks of said front and rear superstructure means.

5. In a semi-trailer of the type having a chassis slightly greater in length than twice that of a full size automobile and adapted to support two automobiles in low transit positions thereon with their front ends facing one another and in the bottom portion of the chassis but spaced apart at a zone medially of the ends of the trailer: longitudinally spaced front and rear superstructures carried by the chassis, each comprising longitudinally spaced pairs of transversely opposite upright posts, and automobile supporting tracks extending longitudinally between and supported by the upper end portions of said pairs of posts with the tracks of each superstructure inclined upwardly toward said medial zone of the trailer and at a height to clear an automobile in a low transit position thereneath; and another set of automobile carrying tracks extending longitudinally between and supported by those posts of the two superstructures which are adjacent to the medial zone of the trailer, said last named tracks occupying a substantially horizontal position at a level substantially midway between the bottom portion of the chassis and the upper ends of said inclined tracks.

6. In a trailer for transporting automotive vehicles and freight: an elongated chassis having supporting wheels and having low rigid sides the upper edge portions of which terminate at a level adjacent to that of the tops of said wheels; means fixed with respect to the chassis providing substantially horizontal ledges along substantially the entire length of the chassis sides near their upper edges, said ledges providing for removably supporting a substantially horizontal platform on the chassis at a level adjacent to that of the tops of the trailer wheels, and upon which platform automotive vehicles, or freight, may be loaded; automobile carrying supports on said chassis between its sides and intermediate its ends, at substantially the level of the wheel axes, said supports being usable when said removable platform is not in position over the supports; knockdown superstructure means for supporting at least one other automotive vehicle on the trailer at an elevation spaced a distance above said platform supporting ledges, said knockdown superstructure means comprising longitudinally spaced pairs of elongated socket members fixed on the chassis sides with the socket members of each pair transversely opposite one another, rigid load bearing posts dismountably stepped in said socket members, tracks lengthwise spanning the space between adjacent pairs of posts, and detachable connections between said tracks and posts disposing the tracks a distance above said platform supporting ledges and transversely spaced a distance to receive the wheels of an automotive vehicle, said detachable connections including cross beams extending transversely between and supported at their ends by the posts of each pair thereof, and upon which the tracks rest, said superstructure means being dismountable so that a platform supported on said ledges may be entirely unobstructed; and means for reinforcing such an unobstructed platform on said supporting ledges, comprising a plurality of said cross beams, and means fixed on the chassis sides for supporting said plurality of cross beams by their ends with the beams in longitudinally spaced positions on the chassis and extending substantially horizontally across the chassis at a level closely adjacent to that of said supporting ledges.

7. The trailer set forth in claim 6 wherein the posts of the superstructure means are provided with connectors on their opposing faces to receive the ends of the cross beams and thus detachably hold the beams in their track supporting positions; and further characterized by the fact that said means for supporting said plurality of cross beams in their platform reinforcing positions comprises connectors similar to those on said posts but fixed to the opposing faces of said socket members, to detachably receive the ends of the beams.

8. In a trailer of the type having a wheel supported chassis comprising a bottom portion at a level substantially corresponding to that of the wheel axes, and having rigid substantially low sides joined at their lower portions to the opposite longitudinal margins of said bottom portion and extending upwardly therefrom with their upper edge portions terminating at a level adjacent to that of the tops of said wheels: means fixed with respect to the chassis sides providing substantially horizontal ledges along substantially the entire length of the chassis sides near their upper edges, said ledges providing for removably supporting a substantially horizontal platform on the chassis at a level adjacent to that of the tops of said wheels, and upon which platform automotive vehicles or freight may be loaded at times when the bottom portion of the chassis is not being used for the support of an automotive vehicle on the trailer; knockdown superstructure means for supporting at least one automotive vehicle on the trailer at an elevation spaced a distance above said platform supporting ledges, said knockdown superstructure means comprising transversely opposite posts long enough to span the space between the chassis sides, post mounting socket means fixed on the chassis sides to removably but rigidly hold the posts in upright positions on the chassis, automobile supporting tracks, and detachable connections between said tracks and posts a distance above said platform supporting ledges, said superstructure means being dismountable so that a platform supported on said ledges may be unobstructed; and means for reinforcing a platform on said ledges, comprising a plurality of said posts, and means fixed on the chassis sides to receive the opposite end portions of said posts to hold the same in longitudinally spaced substantially horizontal positions extending lengthwise between the chassis sides at a level closely adjacent to that of said platform supporting ledges.

9. The trailer set forth in claim 8 further characterized by the provision of cooperating means on the end portions of said posts and said post receiving means on the chassis sides for rigidly but detachably connecting the posts to the chassis sides in the platform reinforcing positions of the posts, whereby the posts rigidly join the upper edge portions of the chassis sides to preclude lateral flexure thereof toward and from one another.

10. In a trailer of the type having a wheel supported chassis comprising a bottom portion at a level substantially corresponding to that of the wheel axes, and having rigid substantially low sides joined at their lower portions to the opposite longitudinal margins of said bottom portion and extending upwardly therefrom with their upper edge portions terminating at a level adjacent to that of the tops of said wheels: knockdown superstructure means for supporting at least one automotive vehicle on the trailer at an elevation above the upper edge portions of the chassis sides, said knockdown superstructure means comprising beam-like upright and transverse members all long enough to span the space between the chassis sides, socket means fixed on the chassis sides to removably but rigidly hold said upright members transversely opposite one another, detachable connections between the transverse members and portions of the upright members spaced a distance above the upper edge portions of the chassis sides, and tracks detachably connected to said transverse members; and means for removably supporting a platform on the trailer substantially flush with the upper edges of the chassis sides comprising a plurality of said beam-like members, and means fixed on the chassis sides for supporting said beam-like members in substantially horizontal positions on the chassis extending transversely between the chassis sides at a level a slight distance beneath that of the upper edges of the chassis sides.

11. In a vehicle for transporting five automobiles of the type having low opposite end portions projecting from a higher central body portion: an elongated rigid chassis having wheels; automobile carrying means displaceably carried by the chassis in a zone substantially medially of the ends of the vehicle and comprising fore and aft supports disposed at levels substantially equal distances above the level of the tops of the vehicle wheels to receive portions at the front and rear of an automobile; longitudinally spaced fore and aft low level automobile carrying means on the chassis for supporting two automobiles in transit positions lower than said first automobile with their higher body portions spaced apart at the medial zone of the vehicle a distance to accommodate therebetween the wheels of said first automobile, each of said low level automobile carrying means comprising fore and aft supports disposed to receive portions at the front and rear of an automobile, the aft supports of the forward automobile carrying means and the forward supports of the aft automobile carrying means being located substantially under and spaced beneath the fore and aft supports, respectively, of said medial automobile carrying means a distance only slightly greater than the height of the opposing end portions of automobiles on said low level automobile carrying means; and longitudinally spaced fore and aft high level automobile carrying means on the chassis, displaceable relative to one another, for supporting two more automobiles in high level transit positions substantially superimposed over said low level automobiles, displacement of the displaceable medial and high level automobile carrying means enabling loading and unloading of the low level automobiles from one end of the vehicle, each of said high level automobile carrying means comprising fore and aft supports located over the fore and aft supports of one of said low level automobile carrying means and disposed to receive portions at the front and rear of an automobile, the forward supports of the forward high and low level automobile carrying means and the aft supports of the aft high and low level automobile carrying means, in their transit positions, being spaced vertically a distance only slightly greater than the height of the remote end portions of automobiles on said low level automobile carrying means, and the aft supports of said forward high level automobile carrying means and the forward supports of said aft high level automobile carrying means, in their transit positions, being disposed over and at levels sufficiently higher than those of the fore and aft supports of said medial automobile carrying means as to clear the end portions of an automobile on said medial automobile carrying means and to hold the adjacent end portions of said high level automobiles in positions overlapping the end portions of an automobile on said medial automobile carrying means.

12. The method of loading five automobiles of the type having substantially low opposite end portions projecting from a higher central body portion on a transport vehicle having a loading space only slightly longer than twice the length of a full size automobile, which method comprises: placing two automobiles in substantially superimposed positions on each end portion of the vehicle with the superimposed automobile at angles diverging in a vertical plane toward the mid-portion of the vehicle, and with the lower automobiles spaced apart lengthwise of the vehicle a distance sufficient to enable the front and rear wheels of a fifth automobile to be accommodated lengthwise in the space between the higher body portions of said low automobiles, and with the height between the divergent end portions of said superimposed automobiles sufficient to accommodate the low end portions of the fifth automobile therebetween; and placing the fifth automobile on the vehicle in a position extending lengthwise over the opposing end portions of said low automobiles, with its wheels in the space between the higher body portions of said low automobiles, and with its low opposite end portions nested in the spaces between the divergent end portions of said superimposed automobiles.

References Cited in the file of this patent

UNITED STATES PATENTS

| Number | Name | Date |
|---|---|---|
| 1,841,066 | Simning | Jan. 12, 1932 |
| 1,931,803 | Perkins et al. | Oct. 24, 1933 |
| 1,978,287 | Thomas | Oct. 23, 1934 |
| 2,492,829 | Baker | Dec. 27, 1949 |
| 2,610,891 | Crockett | Sept. 16, 1952 |